(12) United States Patent
Nielsen

(10) Patent No.: US 9,480,351 B2
(45) Date of Patent: Nov. 1, 2016

(54) DISPENSING DEVICE FOR DISPENSING A POWDER PRODUCT

(71) Applicant: Mezurware, LLC, Kernersville, NC (US)

(72) Inventor: Keld Krogh Nielsen, Graasten (DK)

(73) Assignee: Mezurware, LLC, Kernersville, NC (US)

( * ) Notice: Subject to any disclaimer, the term of this patent is extended or adjusted under 35 U.S.C. 154(b) by 0 days.

(21) Appl. No.: 14/688,557

(22) Filed: Apr. 16, 2015

(65) Prior Publication Data

US 2015/0298873 A1     Oct. 22, 2015

Related U.S. Application Data

(60) Provisional application No. 61/981,025, filed on Apr. 17, 2014, provisional application No. 62/105,383, filed on Jan. 20, 2015.

(51) Int. Cl.
| | |
|---|---|
| *B65D 47/06* | (2006.01) |
| *B65D 47/04* | (2006.01) |
| *A47G 19/34* | (2006.01) |
| *B65D 83/06* | (2006.01) |
| *G01F 11/26* | (2006.01) |
| *A47J 47/01* | (2006.01) |

(52) U.S. Cl.
CPC ............... *A47G 19/34* (2013.01); *A47J 47/01* (2013.01); *B65D 83/06* (2013.01); *G01F 11/261* (2013.01)

(58) Field of Classification Search
CPC ....... A47G 19/34; A47J 47/01; B65D 83/04; B65D 83/06; G01F 11/26; G01F 11/261

USPC .................................... 222/454, 455
See application file for complete search history.

(56) References Cited

U.S. PATENT DOCUMENTS

| | | | | |
|---|---|---|---|---|
| 1,964,609 A | * | 6/1934 | Cone ................. | B43L 25/06 222/455 |
| 2,243,452 A | * | 5/1941 | Bickel ............... | G01F 11/261 222/455 |
| 3,185,357 A | * | 5/1965 | Merkel ............... | A47G 19/34 222/42 |

(Continued)

FOREIGN PATENT DOCUMENTS

EP           1494939       1/2005

OTHER PUBLICATIONS

International Search Report and Written Opinion for corresponding PCT Application No. PCT/US2015/026172, date of mailing Jul. 13, 2015, 13 pages.

*Primary Examiner* — Nicholas J Weiss
(74) *Attorney, Agent, or Firm* — Myers Bigel & Sibley P.A.

(57) ABSTRACT

A staging hopper adapted for being inserted inside the neck of a container includes: a ceiling; a dividing wall projecting from the ceiling having a lower edge; a sloping inlet barrier wall having a rear edge; a floor merging with the barrier wall; and a front wall that extends upwardly from the floor such that a portion of the floor extends forwardly of the front wall. The rear edge of the inlet barrier wall and the top wall define an inlet barrier gap, and the lower edge of the dividing wall and the floor define an outlet barrier gap. The front wall and dividing wall define an outlet chamber. The inlet barrier gap divides an inlet chamber and a barrier chamber, and the outlet barrier gap divides the barrier chamber and the outlet chamber.

6 Claims, 8 Drawing Sheets

(56) References Cited

U.S. PATENT DOCUMENTS

| | | |
|---|---|---|
| 4,015,758 A | 4/1977 | Cavazza |
| 5,029,736 A * | 7/1991 | Maruyama ............. G01F 11/26 222/455 |
| 5,346,105 A | 9/1994 | Onneweer |
| 5,480,071 A * | 1/1996 | Santagiuliana ....... G01F 11/261 220/254.2 |
| 5,495,964 A | 3/1996 | Santagiuliana |
| D587,114 S | 2/2009 | Nielsen |
| 2005/0087567 A1 * | 4/2005 | Nielsen ................. A47G 19/34 222/361 |
| 2011/0163132 A1 | 7/2011 | Moreau |

* cited by examiner

DISPENSING DEVICE FOR DISPENSING A POWDER PRODUCT

RELATED APPLICATIONS

The present application claims priority from and the benefit of U.S. Provisional Patent Application No. 61/981,025, filed Apr. 17, 2014, and U.S. Provisional Patent Application No. 62/105,383, filed Jan. 20, 2015, the disclosure of each of which is hereby incorporated herein by reference in its entirety.

FIELD OF THE INVENTION

The present invention relates to a dispensing device for dispensing a powder product from a container containing the powder product. More particularly, the present invention relates to a powder dispenser being capable of delivering consistently precise doses of powder product.

BACKGROUND OF THE INVENTION

Many combinations of a storage container and a dispensing device are known in the art. In connection with dispensing of instant coffee powder, ground coffee, detergent powder and like granular materials, the normal procedure is to open a container thereof and remove a batch either with a spoon or by pouring. This is an imprecise and often messy procedure. Further, the repeated opening of the storage container in connection with each dispensing operation gives rise to deterioration of those granular products that may lose aroma or oxidize by contact with the oxygen in the atmosphere.

Therefore, there may a need for a simple and inexpensive combination of a storage container and a dispensing device for granular product that protects the contents of the container against deterioration by loss of aroma or oxidation by limiting the contact with the atmosphere, and that dispenses relatively precise and uniform doses without the operator having to resort to further measuring actions.

European Patent Publication No. 1 494 939 discloses a device for providing metered doses of a powdered substance. A similar device is shown in U.S. Design Pat. No. D587,114. It may be desirable to further provide precision dosing devices for powders.

SUMMARY OF THE INVENTION

As a first aspect, embodiments of the invention are directed to a system for dispensing metered doses of powder, comprising: a container having an interior cavity and a neck having an open end; a staging hopper having a collar that fits within the neck of the container, the staging hopper further including a receptacle beneath the collar having a floor and a front wall; and a divider assembled with the neck and the collar, the divider including a ceiling with an opening and a dividing wall that depends from the ceiling, the dividing wall protruding into the receptacle, the opening being positioned above the receptacle. A first passage is formed between the front wall and the ceiling and a second passage is formed between a lower edge of the dividing wall and the floor, the first passage, the second passage, and the opening in the divider being in serial fluid communication with each other.

As a second aspect, embodiments of the invention are directed to a system for dispensing metered doses of powder, comprising: a container having an interior cavity and a neck having an open end; and a staging hopper. The staging hopper has: (a) a collar that fits within the neck of the container; (b) a receptacle beneath the collar having a floor and a sloping wall; (c) a ceiling with an opening positioned above a portion of the receptacle; and (d) a dividing wall that depends from the ceiling, the dividing wall protruding into the receptacle and positioned between the opening and an upper edge of the sloping wall. A first passage is formed between the upper edge of the sloping wall and the ceiling and a second passage is formed between a lower edge of the dividing wall and the floor, the first passage, the second passage, and the opening in the divider being in serial fluid communication with each other.

As a third aspect, embodiments of the invention are directed to a staging hopper adapted for being inserted inside the neck of a container, the staging hopper comprising: a ceiling; a dividing wall projecting from the ceiling having a lower edge; a sloping inlet barrier wall having a rear edge; a floor merging with the barrier wall; and a front wall that extends upwardly from the floor such that a portion of the floor extends forwardly of the front wall. The rear edge of the inlet barrier wall and the top wall define an inlet barrier gap, and the lower edge of the dividing wall and the floor define an outlet barrier gap. The front wall and dividing wall define an outlet chamber. The inlet barrier gap divides an inlet chamber and a barrier chamber, and the outlet barrier gap divides the barrier chamber and the outlet chamber.

DETAILED DESCRIPTION OF EMBODIMENTS OF THE INVENTION

Figure 1:
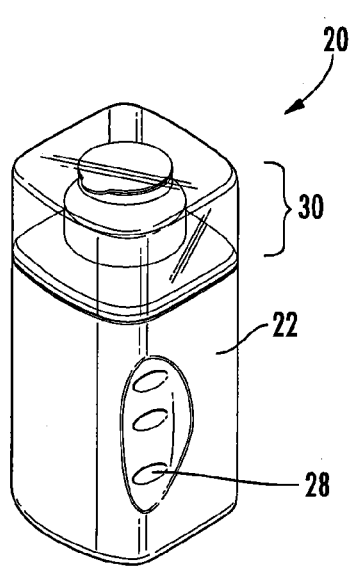
FIG. 1 is a perspective view of a precision metered dose system according to embodiments of the invention, with the lid shown as transparent for clarity.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Figure 2:
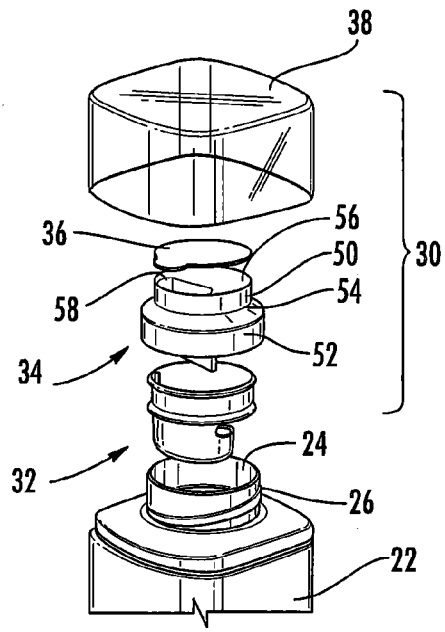
FIG. 2 is a partial exploded perspective view of the system of FIG. 1.
Figure 3A:
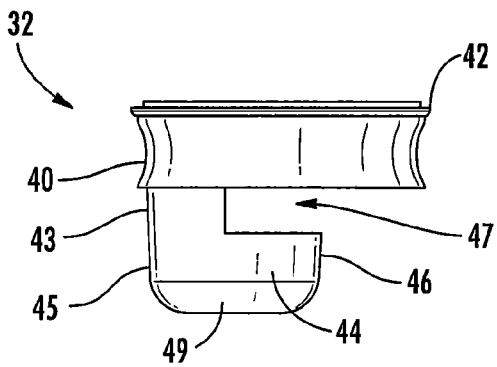
FIGS. 3A-3D are, respectively, front, front section, top and perspective views of a staging hopper of the system of FIG. 1.
Figure 3B:
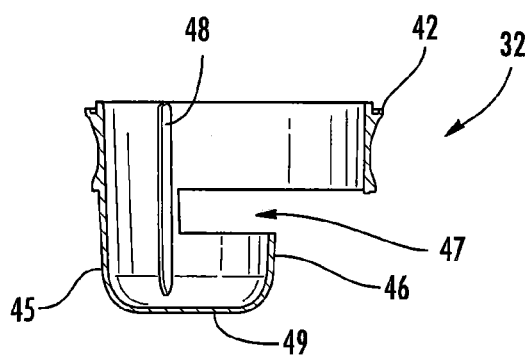
Figure 3C:
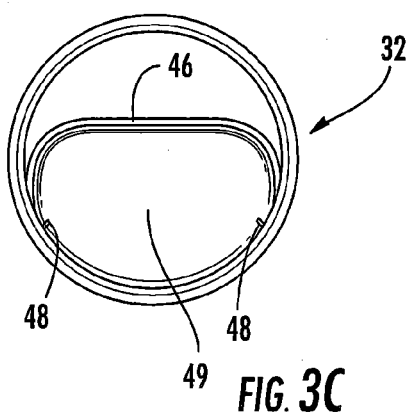
Figure 3D:
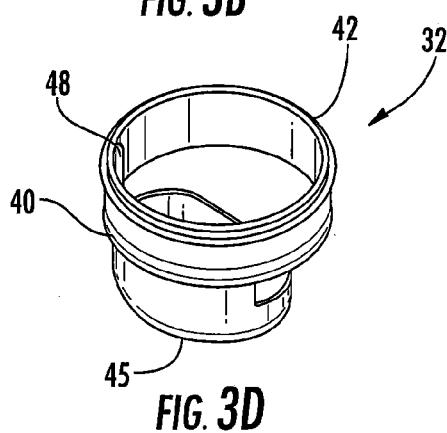

Referring now to the figures, a dispensing system, designated broadly at 20, is illustrated in FIGS. 1-5. As shown in FIGS. 1 and 2, the system 20 includes a bottle 22 having a neck 24 with ridges 26. The bottle 22 includes finger depressions 28 or other indicia that indicate how the bottle 22 is to be grasped and oriented for pouring. A dispensing cap 30 is attached over the opening in the bottle neck 24. The dispensing cap 30 is discussed in more detail below.

Referring now to FIG. 2, the cap 30 includes a staging hopper 32, a divider 34, a foil 36 and a lid 38. As seen in FIGS. 3A-3D, the staging hopper 32 includes an annular collar 40 with an outwardly- and upwardly-extending lip 42. The collar 40 has a concave profile on its outer surface. A receptacle 44 is mounted beneath the collar 40 via a trunk 43. The receptacle 44 is open on its upper end and has a floor 49, a curved wall 45 and a flat wall 46, such that the receptacle 44 generally defines a circle that is flattened on one side. The upper edge of the flat wall 46 is spaced apart from the collar 42, such that a passage 47 is present between the upper edge and the collar 42. The staging hopper 32 also has two short, radially inwardly-extending guides 48 on the inner surfaces of the collar 42 and the receptacle 44.

Figure 4:
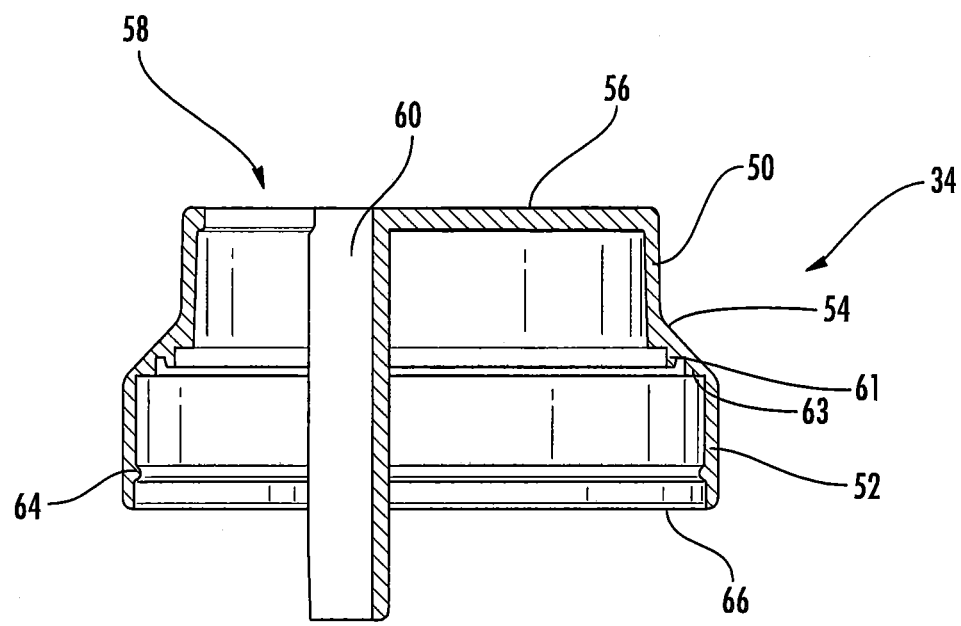
FIG. 4 is a section view of a divider of the system of FIG. 1.

Referring now to FIGS. 2 and 4, the divider 34 includes an upper ring 50, a lower ring 52 that is larger in diameter than the upper ring 50, and a sloped transition ring 54 that spans the upper and lower rings 50, 52. A ceiling 56 covers much of the upper ring 50, leaving an opening 58. An angled dividing wall 60 depends from the ceiling 56 adjacent the radially-inward edges of the opening 58. A nub 61 extends downwardly from the lower surface of the transition ring 54, and a shoulder 63 faces downwardly from the transition ring 54. A groove 66 is formed between the nub 61 and the shoulder 63. A ridge 64 extends inwardly from the lower ring 52.

Figure 5:
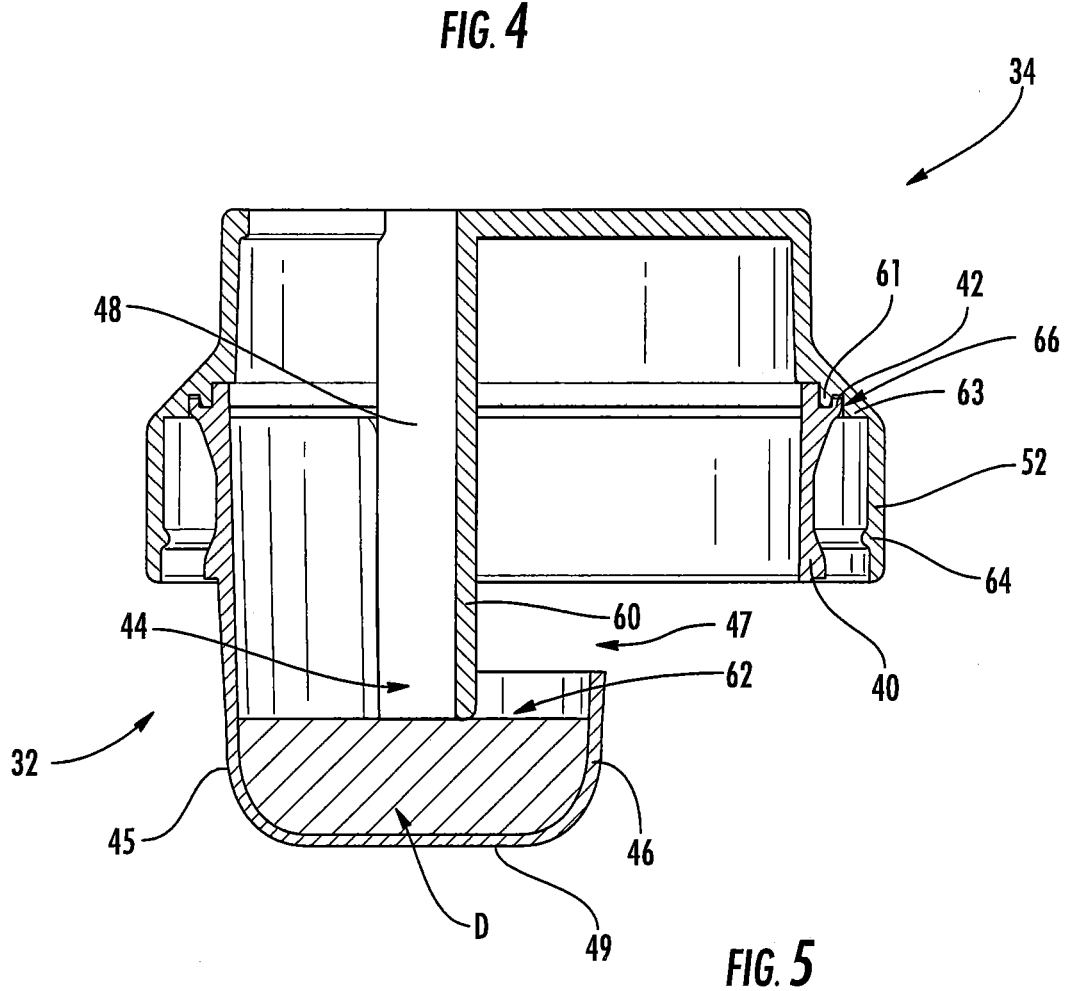
FIG. 5 is a section view of the assembled staging hopper of FIG. 3 and the divider of FIG. 4 with an exemplary powder dose shown therein.

As can be seen in FIG. 5, the staging hopper 32 is assembled to the divider 34 by inserting the lip 42 into the groove 66 between the nub 61 and the shoulder 63. The dividing wall 60 of the divider 34 extends downwardly within the receptacle 44 of the staging hopper 32 and is stabilized somewhat by the guides 48, which are positioned on one side of the dividing wall 60. The lower edge of the dividing wall 60 and the floor 49 are separated, thereby forming a passage 62. The assembled staging hopper 32 and divider 34 can be attached to the neck 24 of the bottle 22. The staging hopper 32 fits within the neck 24 of the bottle 22, with the collar 40 residing inside the neck 24, and the lower ring 52 of the divider 34 fits over the neck 24; the ridge 64 is received in a groove in the neck 24 or bottle 22.

Referring back to FIG. 2, the foil 36 is adhered to the upper surface of the ceiling 56 of the divider 34 and covers the opening 58. The lid 38 fits over the foil 36, divider 34 and staging hopper 32; in the illustrated embodiment, the lid 38 includes an inwardly-directed lip that snaps onto the ridges 26 in the bottle 22; in other embodiments, the lid 38 may snap onto the upper or lower ring 50, 52 of the divider 34.

In operation, the bottle 22 is filled with a powder. With the lid 38 in place (and with the foil 36 already having been removed), the bottle 22 is inverted. As the bottle 22 is upside down, powder from the bottle 22 descends into the collar 40 of the staging hopper 32 and the upper ring 50 of the divider 34, but does not fill the portion of the receptacle 44 that is between the dividing wall 60 and the curved wall 45 of the staging hopper 32. The bottle 22 is then inverted again (i.e., turned right side up), which action causes the powder in the collar 40 to descend either (a) into the receptacle 44 by travelling through the passages 47 and 62, or (b) back into the bottle 22. As such, a predictable amount of powder (shown as dose D in FIG. 5) is contained in the receptacle 44, and in particular a desired, metered dose of powder is contained in the portion of the receptacle that is "downstream" of the passage 62.

The lid 38 can then be removed, and the bottle 22 inverted again. The powder dose D in the receptacle 44 passes out of the opening 58 in the divider 34 and into an external vessel or the like. The powder D dispensed through the opening 58 will be in a desired amount or dose. Also, as the bottle 22 is inverted, the collar 40 and upper ring 50 refill as in the manner described above, such that a subsequent righting of the bottle 22 collects another dose D in the receptacle 44 for subsequent dispensing.

Figure 6:
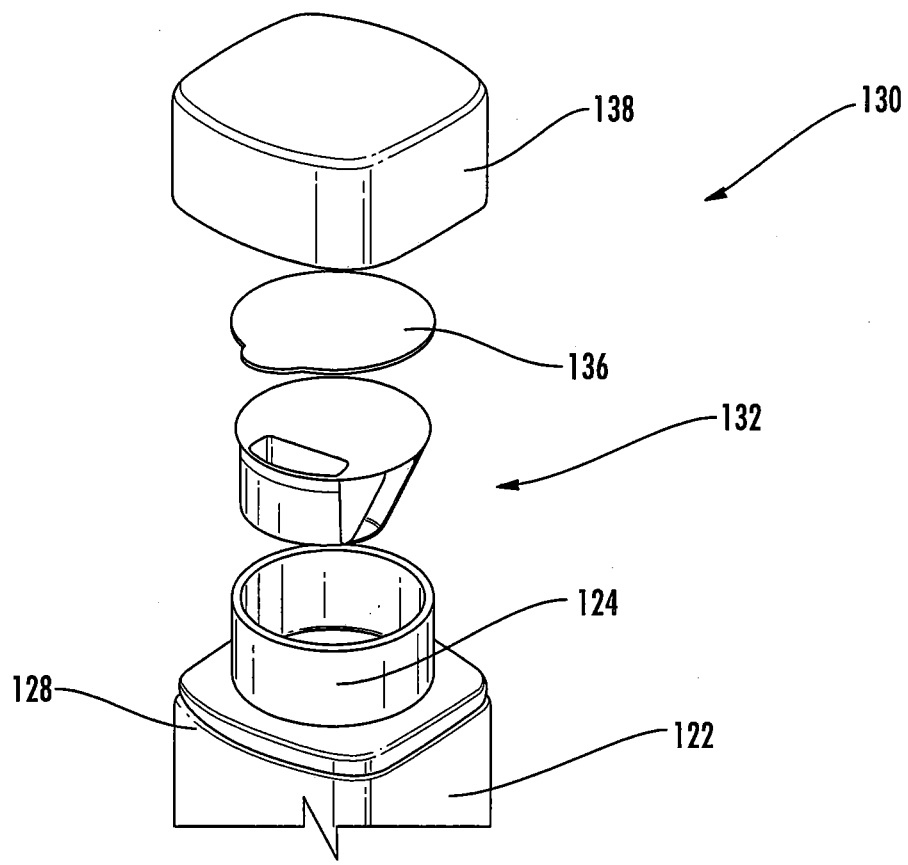
FIG. 6 is an exploded perspective view of a precision metered dose system according to alternative embodiments of the invention.

Another embodiment of a dosing cap, designated broadly at 130, is shown in FIGS. 6-9. The cap 130 fits within the neck 124 of a bottle 122, wherein the neck is somewhat larger than the neck 24 of bottle 22 above. As shown in FIG. 6, the cap 130 includes a staging hopper 132 that includes some of the features of the divider 34 discussed above, and further includes a foil 136 and a lid 138 similar to those described above, but lacks a divider. The staging hopper 132 is described below.

Figure 7:
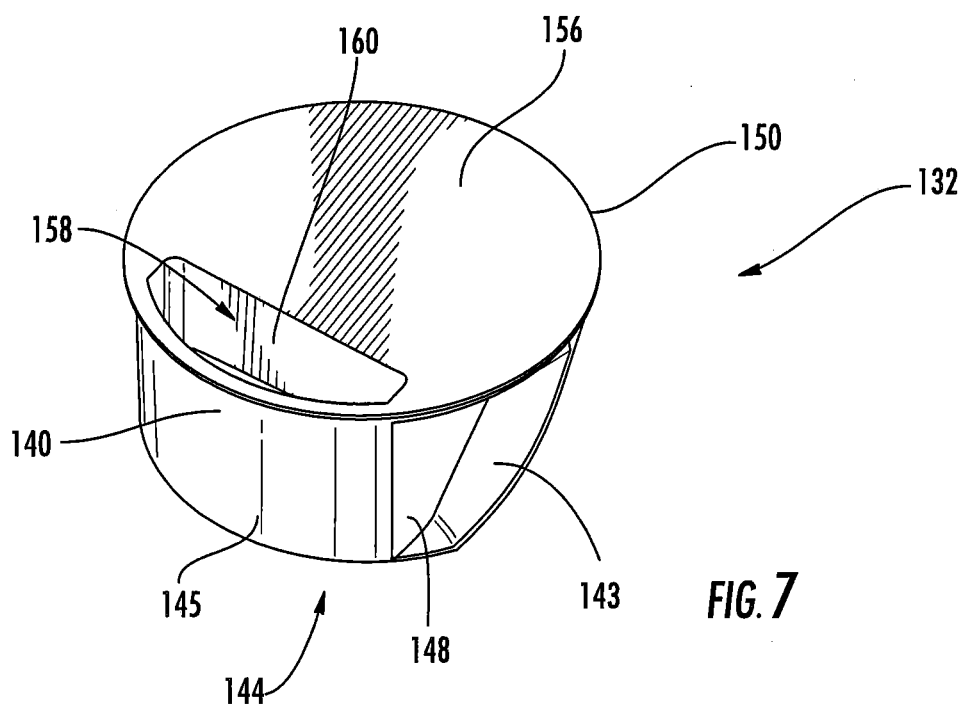
FIG. 7 is a perspective view of the staging hopper of the system of FIG. 6.
Figure 8:
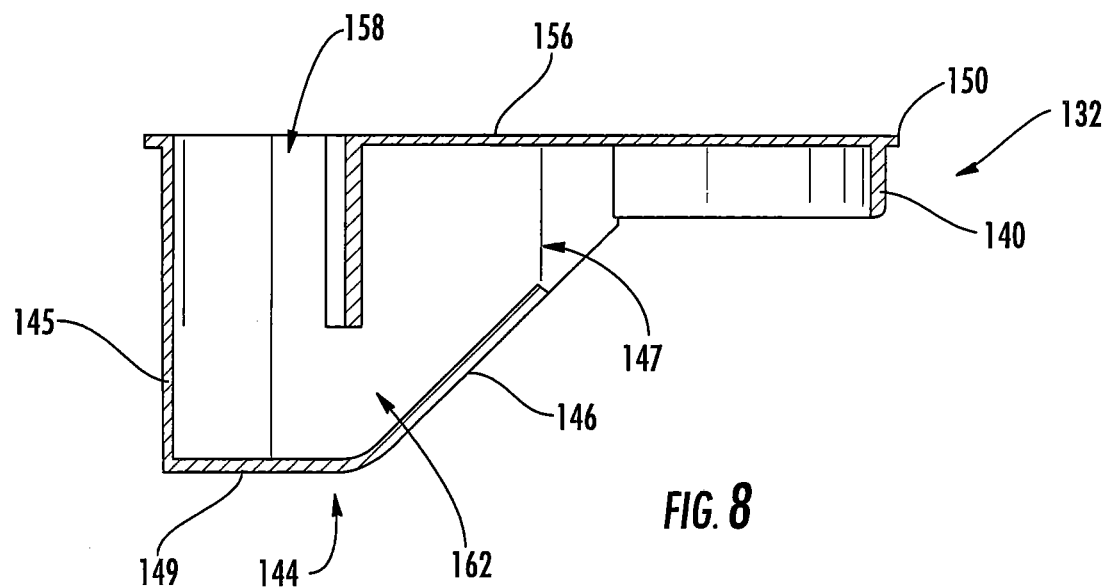
FIG. 8 is a section view of the staging hopper of FIG. 7.
Figure 9:
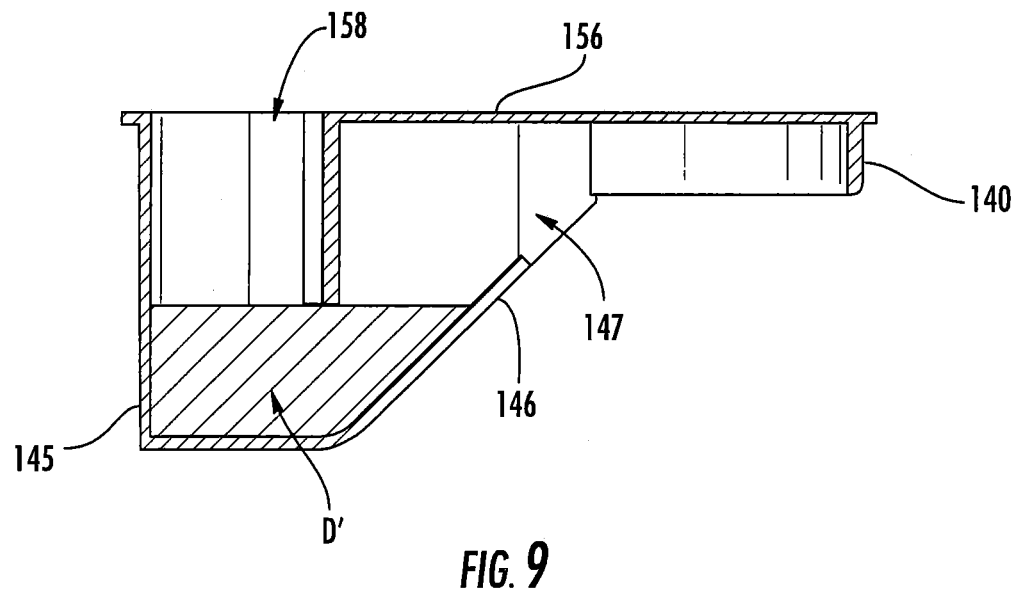
FIG. 9 is a section view of the staging hopper of FIG. 7 with an exemplary powder dose shown therein.
Figure 10:
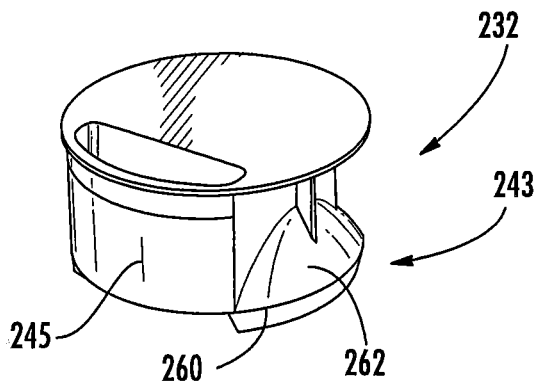
FIG. 10 is a top perspective view of a staging hopper according to alternative embodiments of the invention.
Figure 11:
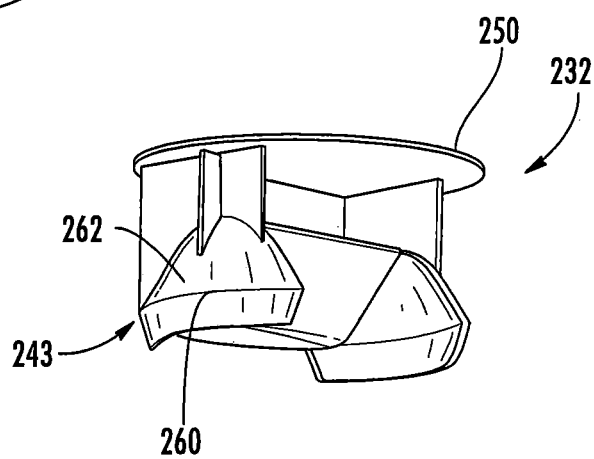
FIG. 11 is a bottom perspective view of the staging hopper of FIG. 10.
Figure 12:
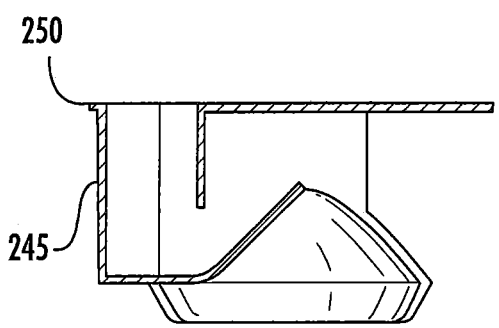
FIG. 12 is a front section view of the staging hopper of FIG. 10.

Referring to FIGS. 7 and 8, the staging hopper 132 has a collar 140 and a receptacle 144 mounted below the collar 140. The receptacle 144 has a curved wall 145 and a floor 149; however, the receptacle 144 includes a sloping wall 146 rather than a generally vertical wall as described above, and also includes side walls 148 with radially outward-extending wings 143. The staging hopper 132 also includes a ceiling 156 with an opening 158, from which a dividing wall 160 depends. The lower edge of the dividing wall 160 is positioned between the curved wall 145 and the sloping wall 146. As a consequence, a passageway 147 is formed between the upper edge of the sloping wall 146 and the lower surface of the ceiling 156, and a second passageway 162 is formed between the lower edge of the dividing wall 160 and the floor 149. A lip 150 extends radially outwardly from the ceiling 156.

The cap 130 fits within the neck 124 of the bottle 122, with the collar 140 and wings 143 interference fit inside the neck 124 and the lip 150 resting atop the neck 124. The foil 136 overlies the ceiling 156 and the opening 158. The lid 138 covers the foil 136 and snaps into place on the bottle 122 via a ridge (not shown) that fits within a groove 128 in the sides of the bottle 122.

Operation of the bottle 122 is similar to that described above for the bottle 22. With the lid 138 in place, the bottle 122 is inverted, which causes powder to flow from the bottle 122 onto the underside of the ceiling 156. When the bottle 122 is righted, some of the powder collected on the ceiling 156 is caught by the sloping wall 146 and passes into the receptacle 144 rather than back into the bottle 122. The powder collected in the receptacle 144 is a precise amount and is represented by dose D' in FIG. 9. When the bottle 22 is inverted again with the lid 138 removed, the dose D' flows from the receptacle 144 through the opening 158 and out of the cap 130. This second inversion of the bottle 122 collects powder on the underside of the ceiling 156 again, such that a re-righting of the bottle 122 reloads another dose D' of powder. This process can be repeated for subsequent doses.

Although the cap 130 may be employed with a number of different bottles, the cap 130 may be particularly appropriate for use with a bottle with an existing lid (e.g., the cap 130 may be retrofitted into the bottle), or if a bottle design includes specific threads on the outside of the neck, such as "child-proof" threads. It may also be suitable for use with a glass bottle or jar. The ability of the cap 130 to snap into place within the neck of an existing bottle may be advantageous.

Figure 13:
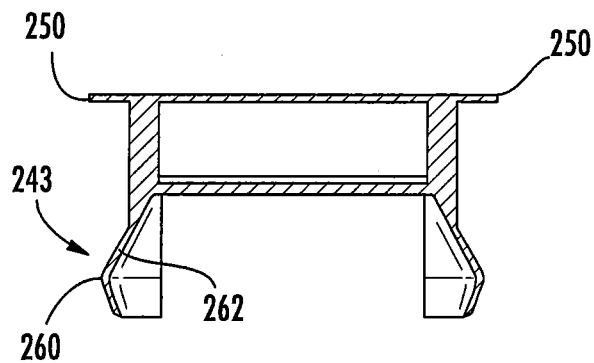
FIG. 13 is a side section view of the staging hopper of FIG. 10.

Another embodiment of a staging hopper, designated broadly at 232, is shown in FIGS. 10-13. The staging hopper 232, which fits within the neck 124 of a bottle 122, is similar to the staging hopper 132, but with some differences as described herein. Specifically, the wings 243 of the staging hopper 232 have an angled convex profile (see FIG. 13) with an outermost edge 260 that describes an arc of approximately 60 degrees that is substantially continuous with the curved wall 245. Thus, as can be seen in FIG. 13, the outermost edge 260 extends radially outwardly almost to the extent of the lip 250. The upper portions 262 of the wings 260 are buttressed by gussets 264 that extend downwardly from the lip 250.

When the staging hopper 232 is inserted into the neck 124 of a bottle 122, the wings 260 deflect inwardly. As such, once the staging hopper 232 is in place, with the lip 250 resting on the upper edge of the neck 124, the deflected wings 260 apply a radially-outward force on the inner surface of the neck 124. This force can help to maintain the staging hopper 232 in place within the neck 124.

One of the potential issues that can arise with the staging hoppers 132, 232 is some imprecision in the measurement of doses/quantities dispensed. Typically, the staging hopper 132, 232 is inserted into a glass or plastic jar, with the curved walls 145, 245 abutting the inner edge of the jar. However, the dimensions of jars formed of these materials can vary significantly, which in turn can impact the dosage D' contained in the receptacles 144, 244; the amount dispensed in each dose may differ by 10-15 percent or more.

A staging hopper 332 illustrated in FIGS. 14-17 can address this variation in dose amount. The staging hopper 332 is similar to the staging hoppers 132, 232 in that it includes a floor 349, an inlet barrier wall 346, a dividing wall 360, and a ceiling 356 that define an inlet chamber X and a barrier chamber Y. However, the staging hopper 332 also includes a front wall 345 that is positioned between the dividing wall 360 and the inner surface of the neck of the jar. L-shaped side walls 321 span the edges of the dividing wall 360 and the front wall 345. Thus, an outlet chamber Z is defined by the dividing wall 360, the front wall 345, and the side walls 321, with a dispensing outlet 358 defined by the upper edges of these structures. The lower edge of the front wall 345 merges with the floor 349, which extends forwardly to a rim 339 that contacts the inner surface of the neck of the jar. As such, the front wall 345 is spaced apart from the inner surface of the neck of the jar.

Figure 14:
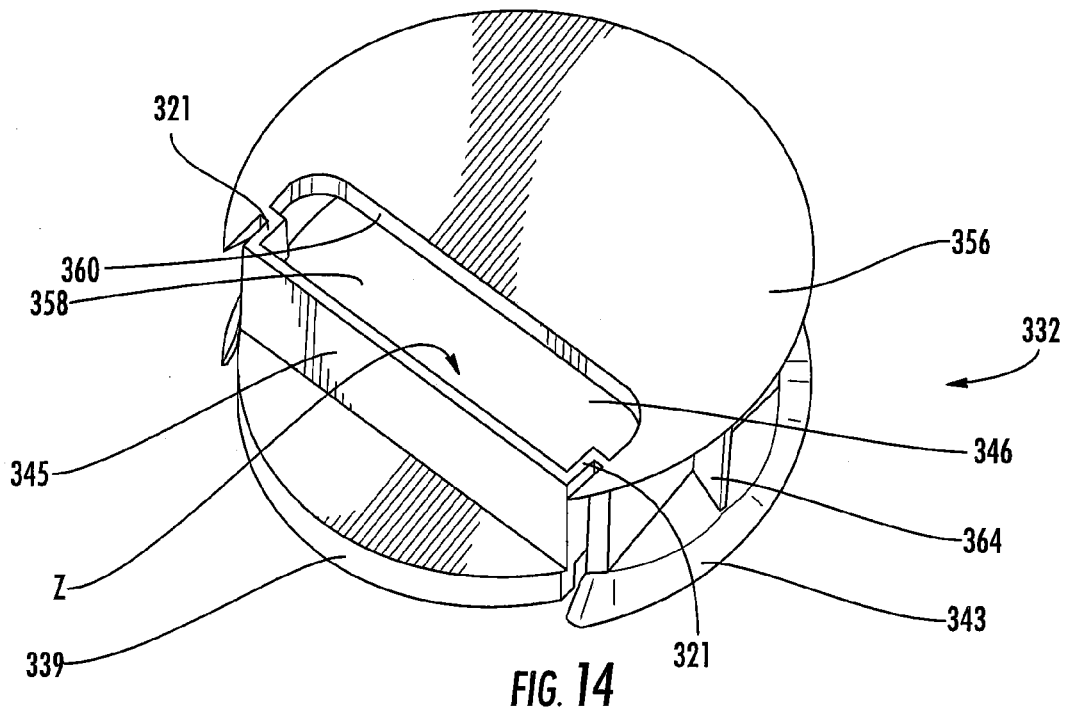
FIG. 14 is a perspective view of a dispensing device according to additional embodiments of the present invention.
Figure 15:
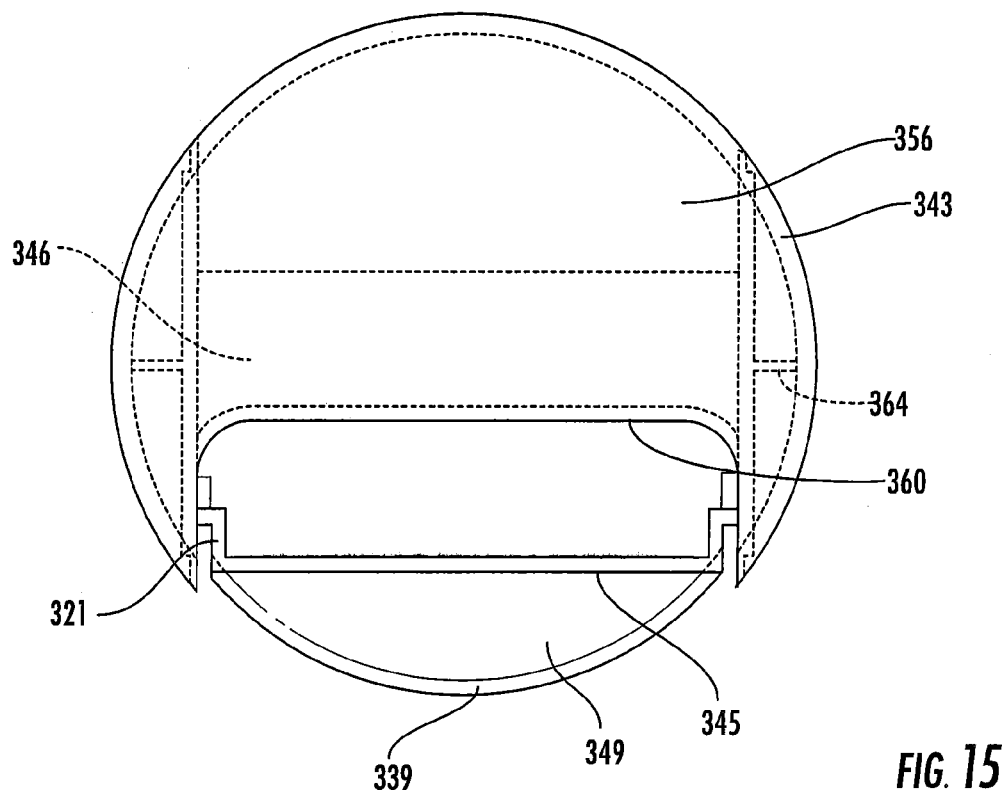
FIG. 15 is a top view of the dispensing device of FIG. 14.
Figure 16:
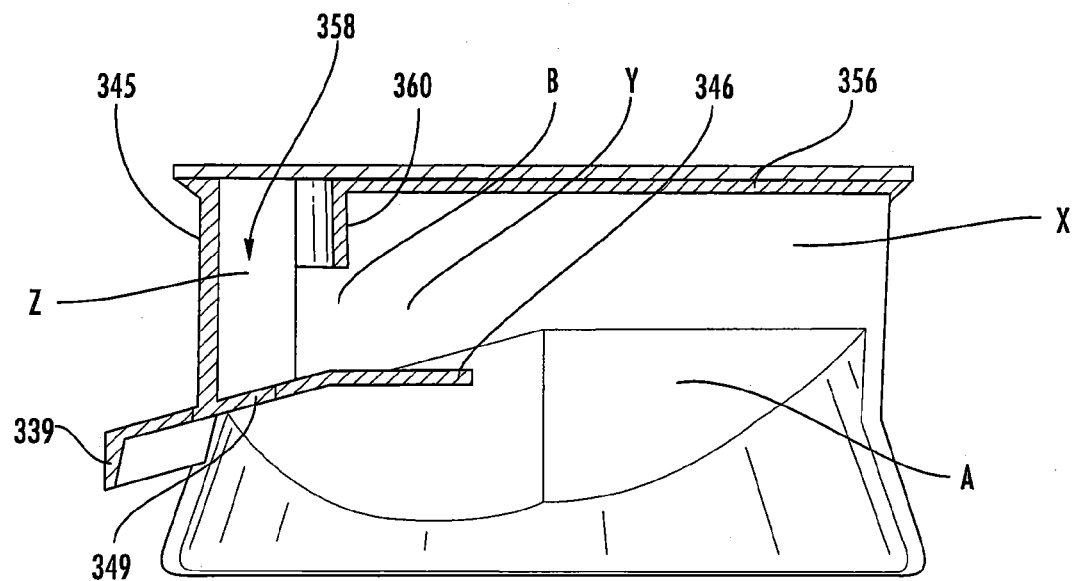
FIG. 16 is a side section view of the dispensing device of FIG. 14.
Figure 17:
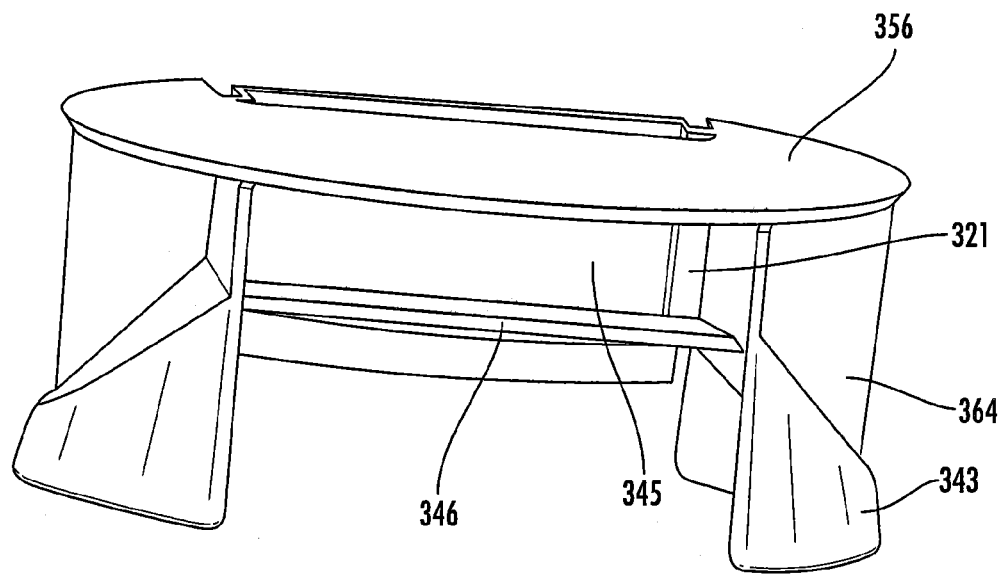
FIG. 17 is a rear perspective view of the dispensing device of FIG. 14.

It can also be seen in FIGS. 14, 15 and 17 that the staging hopper 332 employs wings 343 on either side to maintain the staging hopper 332 in place in the jar. The wings 343, which are reinforced with vertical ribs 364, are able to deflect radially inwardly during installation in the neck of the jar; the wings 343 remain in a slightly deflected state, which causes them to exert radially outward pressure on the neck of the jar to keep the staging hopper 332 in place.

Use of the staging hopper 322 is similar to that of the staging hopper 132, 232 described above. The jar is inverted so that the mouth of the jar and the ceiling 356 of the staging hopper 332 face generally downwardly. In this inverted position of the jar, granular material will flow into the inlet chamber X and further into the barrier chamber Y through the inlet barrier gap A until being stopped by the dividing wall 360. The jar is then rotated so that the mouth of the jar and the ceiling 356 are facing generally upwardly. A portion of the granular material in the inlet chamber X will flow back through the inlet barrier gap A into the jar, and the remainder of the granular material will be prevented from doing so by inlet barrier wall 346. This remaining portion of the granular material will flow into the barrier chamber Y and the outlet chamber Z.

When the jar thereafter is inverted once again, most of the material in the barrier chamber Y and essentially all of the material in the outlet chamber Z will flow out through the dispensing aperture 358 while a new portion of material enters the inlet chamber and overflows into the barrier chamber through the inlet barrier gap A. The granular material in the jar will thus be dispensed in substantially uniform portions for each time the jar is returned to a generally upright position and thereafter inverted to a generally upside down position. However, because the front barrier of the dispensing chamber Z is formed by the front wall 345 rather than the curved wall 145, 245 as it abuts the inner surface of the neck of the jar, the amount contained in the dispensing chamber Z and, therefore, dispensed from the dispensing outlet 358 may be more consistent than with the staging hoppers 132, 232.

Figure 18:
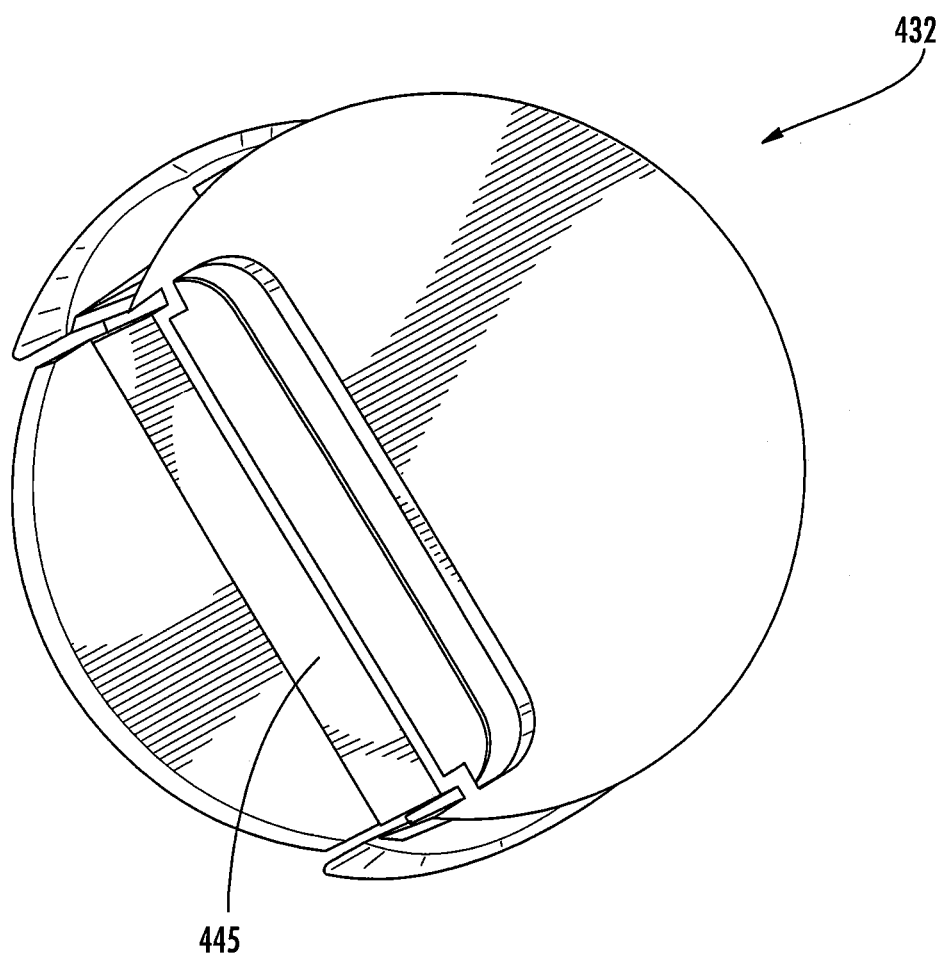
FIG. 18 is a perspective view of an alternative embodiment of a dispensing device according to the present invention.

Those skilled in this art will appreciate that variation of different dimensions of the staging hopper 332 can enable it to dispense different doses/amounts. For example, the position of the front wall and/or the barrier wall can be changed, and/or their heights can be adjusted (see staging hopper 432 in FIG. 18, in which the position of the front wall 445 has been varied). Other variations will be apparent to those of skill in this art.

It should also be noted that the staging hoppers 332 can be manufactured via injection molding, and can be formed as monolithic components molded in a single shot of the mold.

Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A staging hopper adapted for being inserted inside the neck of a container, the staging hopper comprising:
    a ceiling;
    a dividing wall projecting from the ceiling having a lower edge;
    a sloping inlet barrier wall having a rear edge;
    a floor merging with the barrier wall; and
    a front wall that extends upwardly from the floor such that a portion of the floor extends forwardly of the front wall;
    wherein the rear edge of the inlet barrier wall and the ceiling define an inlet barrier gap, and the lower edge of the dividing wall and the floor define an outlet barrier gap; and
    wherein the front wall and dividing wall define an outlet chamber; and
    wherein the inlet barrier gap divides an inlet chamber and a barrier chamber, and the outlet barrier gap divides the barrier chamber and the outlet chamber;
    wherein a rim of the floor engages the neck, and wherein the front wall is spaced apart from the neck.

2. The combination defined in claim 1, wherein the staging hopper is a monolithic component.

3. The combination defined in claim 1, wherein the staging hopper includes wings positioned radially outwardly of the outlet chamber.

4. The combination defined in claim 3, wherein the wings are configured to deflect radially inwardly upon insertion of the staging hopper into the neck of the container.

5. A staging hopper in combination with a container having a neck, the combination comprising:
    a ceiling;
    a dividing wall projecting from the ceiling having a lower edge;
    a sloping inlet barrier wall having a rear edge;
    a floor merging with the barrier wall; and
    a front wall that extends upwardly from the floor such that a portion of the floor extends forwardly of the front wall;
    wherein the rear edge of the inlet barrier wall and the ceiling define an inlet barrier gap, and the lower edge of the dividing wall and the floor define an outlet barrier gap; and
    wherein the front wall and dividing wall define an outlet chamber; and
    wherein the inlet barrier gap divides an inlet chamber and a barrier chamber, and the outlet barrier gap divides the barrier chamber and the outlet chamber;
    wherein a rim of the floor engages the neck, and wherein the front wall is spaced apart from the neck;
    and wherein the staging hopper is a monolithic component with wings positioned radially outwardly of the outlet chamber.

6. The combination defined in claim 5, wherein the wings are configured to deflect radially inwardly upon insertion of the staging hopper into the neck of the bottle.

* * * * *